G. TOWNSEND.
PACKAGING AND WRAPPING MACHINE.
APPLICATION FILED APR. 12, 1909.
989,666.
Patented Apr. 18, 1911.
3 SHEETS—SHEET 1.
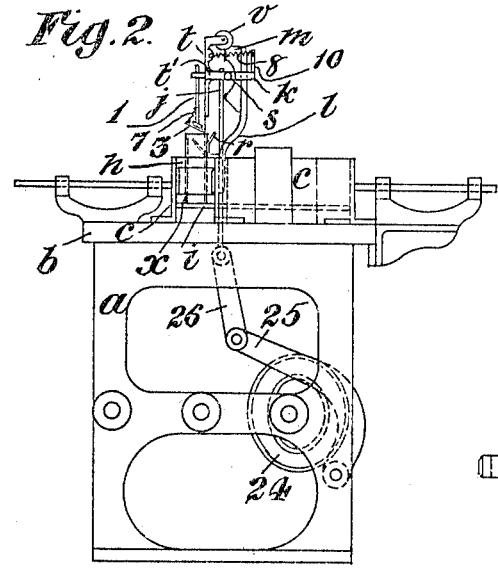
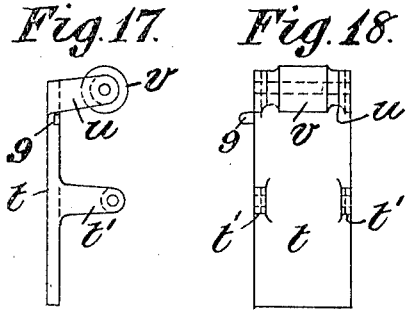
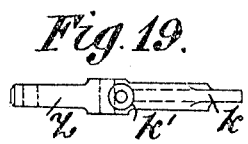
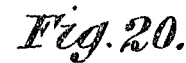
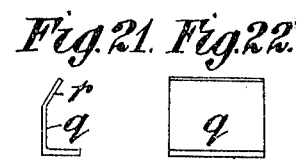
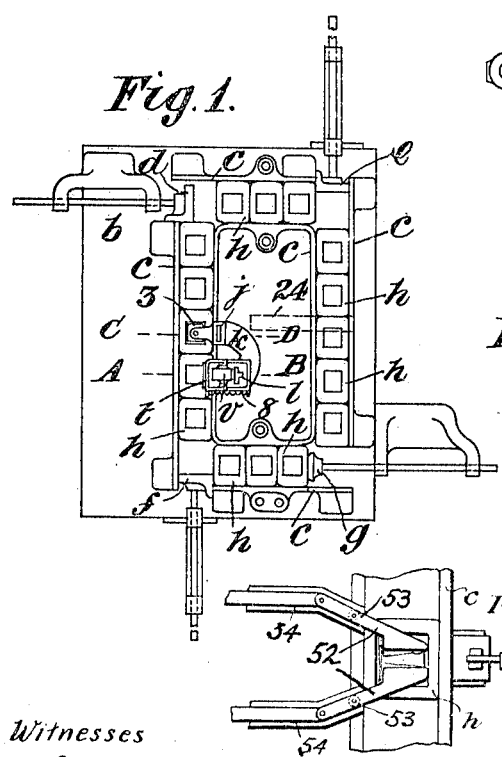
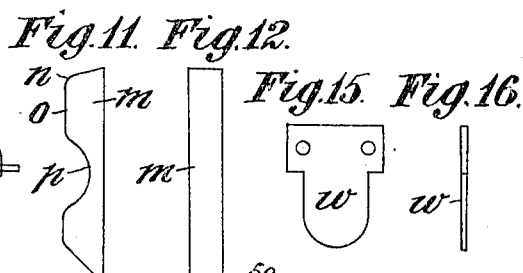
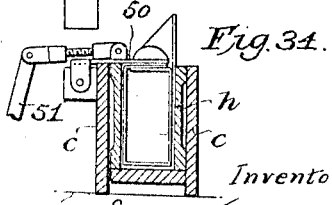
Witnesses
H. C. Robinette
G. M. Stucker
Inventor
George Townsend
by Meyers, Cushman & Rea
Attorneys G. TOWNSEND.
PACKAGING AND WRAPPING MACHINE.
APPLICATION FILED APR. 12, 1909.
989,666.
Patented Apr. 18, 1911.
3 SHEETS—SHEET 2.
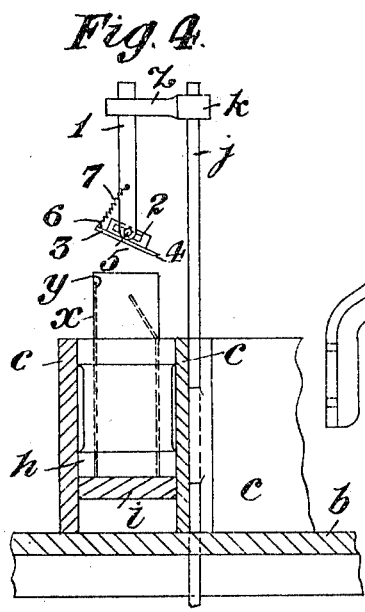
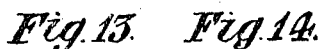
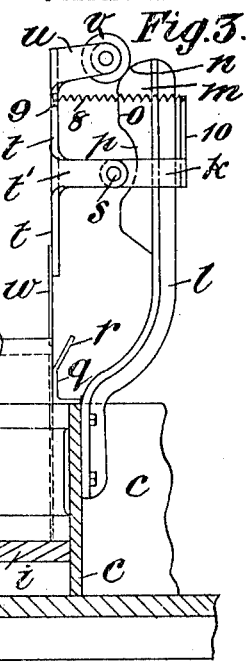
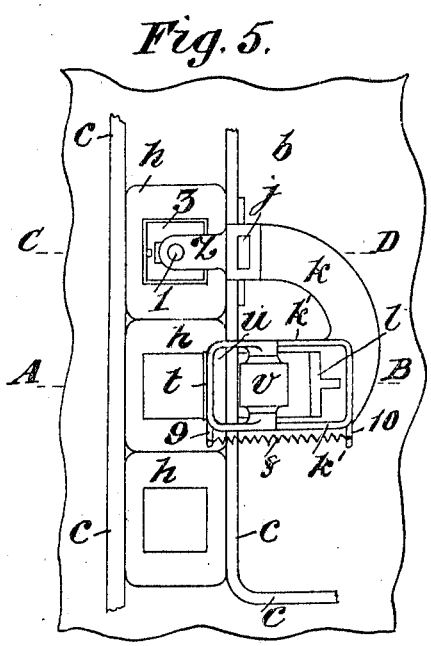
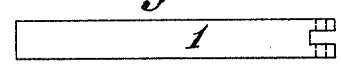
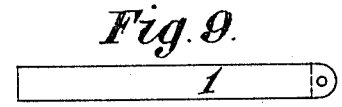
Witnesses
Inventor
George Townsend
by Meyers Cushman & Rea
Attorneys

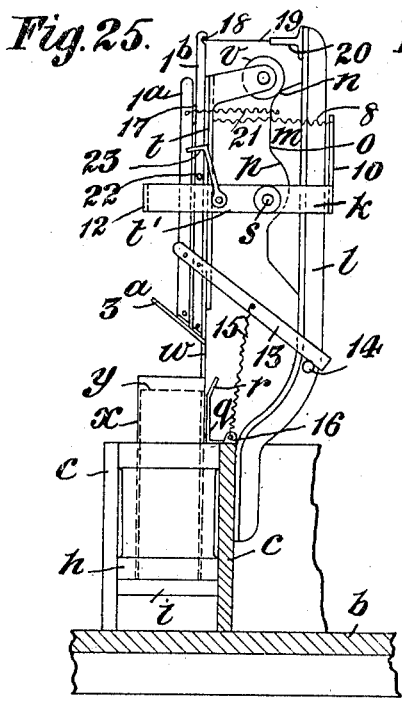
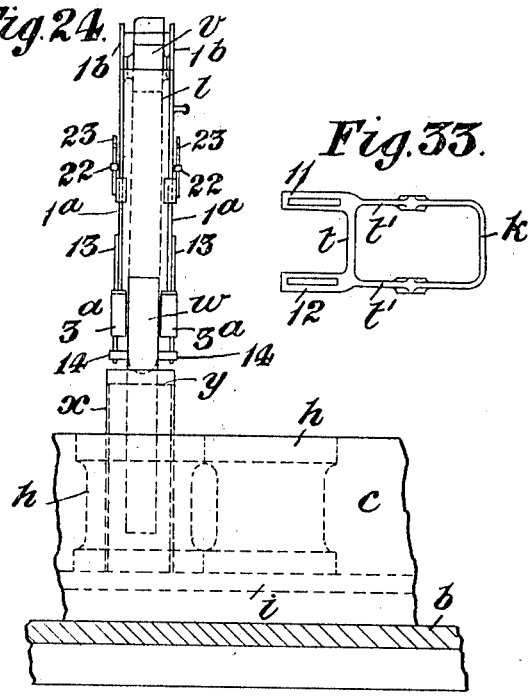
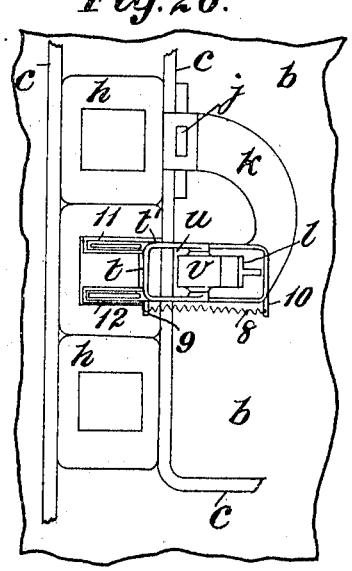

UNITED STATES PATENT OFFICE.

GEORGE TOWNSEND, OF MOSCOW, RUSSIA, ASSIGNOR TO JOB DAY AND SONS LIMITED, OF LEEDS, ENGLAND, A CORPORATION OF ENGLAND.

PACKAGING AND WRAPPING MACHINE.

989,666.   Specification of Letters Patent.   Patented Apr. 18, 1911.

Application filed April 12, 1909. Serial No. 489,403.

*To all whom it may concern:*

Be it known that I, GEORGE TOWNSEND, residing at Mala Kasyonnie Peroulock, Sadovy House, Cilivanofskie No. 13, Moscow, in the Empire of Russia, engineer, have invented new and useful Improvements in Packaging and Wrapping Machines, of which the following is a specification.

This invention relates to improvements in packaging machines, such as are used for packeting tea, coffee, dry soap, powdered and other dry goods.

Hitherto difficulty has been experienced in closing the mouth or top of a packet after the material has been inserted into the packet so as to form a tight package in such a manner as to prevent material leaking therefrom.

The object of this invention is to overcome the difficulty hereinabove described when the lined or double bag is used for holding tea, coffee, etc., by providing means whereby a portion of the top end or ends of the lining or linings only of a packet or bag are first folded over the contents of said bag and afterward completing the fold of the bag by any well known means. The end of the bag or packet folded in this manner will first have the lining or linings alone at one side thereof folded on its contents within the upstanding portions of the lining and the outer bag before the latter are folded, so that when the bag or packet is opened to discharge the contents thereof, or for any other purpose, the fold of the lining first turned in will remain closed and prevent the contents of the bag escaping until said fold is raised.

This invention may be conveniently carried into practice by mechanism arranged as hereinafter described, but which will require to be modified according to the type or class of packaging or packeting machine to which it is applied.

Figure 1 is a plan of a packaging machine provided with a rectangular track in which a number of boxes containing the bags to be folded and closed are made to be intermittently traversed by means of plungers; Fig. 2 an end elevation of the same; Fig. 3 is a transverse section drawn to a larger scale on lines A, B, Figs. 1 and 5; Fig. 4 is an enlarged transverse section on lines C, D, Figs. 1 and 5; Fig. 5 is an enlarged part plan of Fig. 1; Fig. 6 is an elevation of a rammer or flattener; Fig. 7 an end elevation of the same; Fig. 8 a plan of same; Fig. 9 an elevation of flattener or rammer carrying rod; Fig. 10 a plan of same; Fig. 11 a side elevation of cam piece; Fig. 12 a front view of same; Fig. 13 a side elevation of bracket to which the cam piece is fixed; Fig. 14 a back elevation of the same; Fig. 15 a front elevation of a metal plate or blade; Fig. 16 an end elevation of the same; Fig. 17 a side elevation of the blade holder or carrier; Fig. 18 a back elevation of the same; Fig. 19 a reciprocating bracket in which the blade carrier is mounted; Fig. 20 a plan of same; Fig. 21 an end elevation of guide plate; Fig. 22 a back elevation of same; Fig. 23 views of spring; Fig. 24 is an enlarged elevation of a modified arrangement in which two flatteners or rammers are used; Fig. 25 a side elevation of the same with the rectangular track of the machine shown in section; Fig. 26 is a plan of Fig. 25; Fig. 27 is a plan of flattener; Fig. 28, an end elevation of same; Fig. 29 an elevation of one of the supporting bars for the flattener; Fig. 30 a plan of same; Fig. 31 an elevation of operating bar; Fig. 32 a plan of same; Fig. 33 a plan of the carrier; Fig. 34 a detail view showing one of the folders for closing one side of the bag, and Fig. 35 a detail plan view showing fingers for closing simultaneously two sides of the bag after the folder in Fig. 34 has completed its operation. Figs. 3 to 33 inclusive are drawn to a larger scale than Figs. 1 and 2.

Like parts in all views are marked with similar letters of reference.

*a* is the framework of the machine, *b* its table, *c* the rectangular track open at its ends in which the four plungers *d*, *e*, *f*, *g*, are arranged to work. In the rectangular track are arranged a number of intermittently traveling boxes *h* which are propelled by the plungers *d*, *e*, *f*, *g*, according to the direction in which they are required to travel. The paper bags to be folded are placed in these boxes with the upper portions of the bags projecting therefrom.

*i* is the false bottom to the rectangular track upon which the boxes rest and travel.

$j$ is the creaser rod or bar which supports the device for creasing the paper folds of the bag.

All the above parts are of a similar description to those described in which the boxes are made to intermittently travel in a reciprocating track formed on the top of the table.

In order to separate a portion of the lining from the outer bag and to first fold the said separated portion prior to closing the lining of the bag, mechanism constructed as follows may be used:—To the creaser bar or rod $j$ is fixed by any suitable means a curved bracket $k$ such as is shown at Figs. 3, 5, 19 and 20. This bracket is made to move up and down with the movement of the creaser bar or rod $j$ which is operated in any ordinary manner; and it embraces a vertical bracket $l$ which is fixed to the inner side of the rectangular track as shown at Fig. 3. To the face of this bracket a cam piece $m$ is fixed provided at its upper end with a circular portion $n$, a vertical portion $o$ and a recess $p$, at or near its lower end. To the upper surface of the rectangular track is fixed a bracket $q$, the upper end $r$ of which is turned at an angle inward toward the bracket $l$. To the curved and moving bracket $k$ are formed two arms $k^1$ Fig. 20 to which the horizontal projecting arm $t^1$ of a plate $t$ is jointed at $s$. The plate $t$ is made to project above and below the arm $t^1$ and its upper end $u$ is bifurcated and turned in the same direction as the arm $t^1$ toward the cam piece $m$ so as to provide bearings for the runner $v$ which works against the face of the cam piece. To the lower end of the plate $t$ is fixed a thin metal plate or blade $w$ which projects below the end of said plate. The end of the blade $w$ is preferably made semicircular as shown at Fig. 15, but it may be of any other suitable shape. The blade $w$ is employed for entering the mouth of the bag and between the outer paper $x$ thereof and the lining $y$. The lining of the bag is made shorter than the outer portion of the bag. On the moving bracket is provided a projection $z$ in which is mounted and fixed a vertical bar 1, Figs. 9 and 10. The lower end of bar 1 is bifurcated to receive the slotted projection 2 formed on, or fixed to, the upper portion of a rammer or flattener 3. The rammer or flattener is shown beveled or chamfered at 4 in order to more readily enter the mouth of the bag within the mold or receptacle $h$ and the said flattener is in pivotable action by means of a pin 5 arranged to pass through the bifurcated end of bar 1 and the slot in the projection 2. On the upper surface of the flattener is a projection 6 to which the end of a spring 7 is attached for keeping the plate normally in an inclined position as shown at Fig. 4.

8 is a spiral spring which is employed for keeping the runner $v$ against the face of the cam piece $m$. The ends of the spring 8 are respectively attached to projection 9 formed on the plate $t$ and to a vertical rod 10 fixed to the moving bracket $k$. In Figs. 1 to 5, 19 and 20, the bracket is so formed that the means for separating the lining $y$ from the outer paper $x$ will be at one point of rest in the circulatory movement of the boxes and the flattener 3 at the next stationary point in advance. In some cases it may be found more convenient to arrange for the lining to be folded inward and simultaneously flattened at the same point. When this is done the apparatus will require to be slightly modified as shown at Figs. 24 to 26. To permit of this being done two narrow flatteners $3^a$ are employed and arranged to work upon each side of the blade $w$, and instead of one bar being employed two vertical bars marked respectively $1^a$ and $1^b$ are employed for each flattener $3^a$. The vertical bars $1^a$ and $1^b$ are arranged to work through the extension pieces 11 and 12 which project respectively from the face of the holder $t$. The vertical bars $1^a$ and $1^b$ are also respectively jointed to a bar 13, the outer and free end of which is kept against a stop 14.—fixed to the bracket 1.—by means of a spring 15, the lower end of which is secured to a projection 16, fixed to the top of the rectangular track $c$. The bar $1^a$ at a suitable distance from its upper end may be provided with a curved projection 17 which forms a distance piece between it and the lever $1^b$. The latter lever is also recessed or hooked at 18 to receive a thin metal spring plate 19, the inner end of which is fixed to a bracket 20 secured to the prolonged end of bracket 1. The two levers $1^a$ and $1^b$ are retained in contact with each other by means of a spring 21. At a suitable distance from the hooked or notched end of lever $1^b$ is a pin or projection 22. To the arm $t^1$ is jointed a hook 23 adapted to engage with the pin 22.

The action of the apparatus is as follows:—A bag having been placed in the mold with its mouth upward as shown in the drawings and the contents having been measured or weighed and shaken therein, the creaser bar $j$ is caused by cam 24, lever 25, and link 26, to move downward, and as the creaser bar descends it carries with it the movable bracket $k$ and the plate $t$ jointed thereto, and also the blade $w$ which is fixed to said plate. In its normal position the runner $v$ will be on the top of the cam piece $m$ and by the time it has worked around the curved portion $n$ on to the vertical portion $o$ the plate $t$ will have descended sufficiently far for the blade $w$ to have entered the mouth of the bag and have moved the outer paper $x$ against the face of the angular portion $r$ of fixing $q$. This enables the blade $w$ as it continues to descend to pass down between the lining y and the inner surface of the outer paper x until the runner v reaches and passes into the recess p of the cam piece m. When the runner enters this recess the spring 8 draws the upper end of the plate t inward thereby throwing the thin metal blade w outward which carries with it the lining y over the contents of the bag in the direction of the dotted lines shown at Fig. 4, thereby leaving the outer paper x in its vertical or upstanding position to be subsequently closed in the ordinary way. At the arrangement shown at Figs. 1 to 5 the plate and blade and parts connected therewith would be returned to their normal position and the box moved under the creasing plate to be rammed by the flattener 3, but when the arrangement shown at Figs. 24 to 26 is employed simultaneously with the turning over of the lining y as described the two folders are brought into action by the spring 15 drawing lever 13 down and as soon as the inclined or chamfered end of the "former" comes in contact with the turned in portion of the lining and contents of the bag by the said lever being held against the stop 14, the continued downward movement of the bracket k, and plate t will cause the flattener 3ª to be moved into a horizontal position by the rod 1ª being moved downward and thus held tightly down for pressing the turned in portion of the lining y on to the contents of the bag. In this arrangement until the bracket k and plate t have traveled a sufficient distance to bring the hook 23 into contact with stop 22, the said flatteners, bars 1ª and 1ᵇ, and lever 13 remain stationary, afterward they travel downward with the said bracket k and plate t and perform the functions described. By allowing the flatteners to remain stationary at the beginning of the operation, the blade w can enter the mouth of the bag and turn inward a portion of the lining y previous to the flatteners 3ª being brought into operation. After the lining has been inturned, as hereinafter described, the bag is subjected to a set of devices for completing the operation of folding the bag. The first folder 50, Fig. 34, operated by a lever 51, folds upon the inturned portion of said lining that side of the bag and its lining opposite said inturned portion of the lining, after which fingers 52 are moved and guided by pins 53 thereon and grooves 54 to fold the two remaining sides and their linings over the previously folded side, and finally the upstanding side of the bag alone is inturned by a folder similar to folder 50.

It will readily be understood that although I have described the invention as being applied to the above named machine it can be readily modified to other makes or constructions of machine, the essential feature being to fold a portion of one or more of the lining or linings inwardly separate from the outer paper, and after the opposite side of the paper and its linings have been folded inward and then the fold completed in the usual way it thereby provides practically an air tight packet for preventing any leakage of its contents, and one in which the inner lining end folds remain closed after the outer end folds have been opened.

It will readily be understood the herein described invention may be applied to wrapping machines as well as packaging machines.

What I claim is—

1. In a packaging machine, means for holding and transporting a filled bag provided with a lining, means for separating the lining from the outer side of the bag at one side thereof, means for folding the separated portion of the lining over the contents of the bag, and folding devices for inturning the remaining upstanding sides of the bag with their linings and the upstanding side without a lining over the folded lining in proper sequence, the side of the bag without a lining being folded last.

2. In a packaging machine, means for holding and transporting a filled bag provided with a lining, means for separating the lining at one side of the bag and inturning said lining only, means for folding the inturned lining on the contents of the bag, and folding means for inturning the remaining upstanding sides of both the bag and lining together on the previous inturned lining and finally inturning the upstanding side alone of the bag over all the previously inturned side flaps.

3. In a packaging machine, means for holding and transporting a filled bag provided with a lining, means for separating the lining from the outer bag at one side thereof and bending said lining inwardly, and means for folding and pressing said inturned portion of the lining over the contents of the bag and creasing the same before the remaining sides of said lining and outer bag are closed thereover.

4. In a packaging machine, means for holding and transporting a filled bag provided with a lining, means for separating the lining from the outer bag at one side thereof and bending said lining inwardly and the bag outwardly, and means for folding and pressing said inturned portion of the lining over the contents of the bag and creasing the same before the remaining sides of said lining and the outer bag are closed thereover.

5. In a packaging machine, means for holding and transporting a filled bag provided with a lining, a blade adapted to be inserted between the outer bag and the lining, means for operating said blade to bend one side of the bag outwardly and the corresponding side of the lining inwardly, and means for folding and pressing said inturned portion of the lining over the contents of the bag before the remaining sides of said lining and the bag are closed.

6. In a packaging machine, means for holding and transporting a filled bag provided with a lining, a blade adapted to be moved longitudinally and inserted between the outer bag and the lining, a cam surface for operating said blade laterally to bend one side of the bag outwardly and the lining inwardly, and means for folding said inturned portion of the lining over the contents of the bag before the remaining sides of the lining and bag are folded.

7. In a packaging machine, means for holding and transporting a filled bag provided with a lining, a blade adapted to be inserted between the outer bag and the lining, means for operating said blade to bend one side of the bag outwardly and the corresponding side of the lining inwardly, and a vertically movable plate adapted to enter the mouth of the bag to fold and press said inturned portion of the lining over the contents of the bag before the remaining sides of the lining and the bag are closed.

8. In a packaging machine, the combination with a rectangular track, receptacles for holding filled bags adapted to circulate intermittently around said track, a support provided with a cam near its upper end, a reciprocating creaser and folder, a movable bracket embracing said support and fixed to said reciprocating creaser, a plate hinged to the movable bracket and contacting at its upper end with said cam, a thin metal blade fixed on the lower end of said hinged plate for separating the outer bag from its lining, and means co-acting with said cam for partly folding a portion of the lining on to the contents of the bag and at the same time leaving the bag and remainder of the lining in an up-standing position.

9. A packaging machine comprising a movable bracket, a plate hinged thereto having a separating blade at its lower end and an offset at its upper end, a cam against which the upper end of said hinged plate bears, a flattener pivoted on the lower end of said movable bracket, whereby after a portion of the lining has been separated from the outer bag and turned inward said portion is flattened down on the contents of said package prior to folding the remaining up-standing portions of the lining and the outer bag.

10. In a packaging machine, a movable bracket having a plate hinged thereto, a separating blade on the lower end of said plate, a cam block mounted on a fixed bracket and adapted to operate said separating blade as the bracket is moved, a pair of vertical rods, a flattener hinged on said rods, a lever pivoted on the rods the free end of which is adapted to engage a fixed stop, and a hook jointed to said plate and adapted to engage a projection on one of said vertical rods, whereby after the plate and the moving bracket have traveled a certain distance the flattener is moved to fold one side of said lining.

GEORGE TOWNSEND.

Witnesses:
W. FAIRBURN-HART,
GUSTAV EUGEN HARTWIG.